United States Patent
Kamochi et al.

(10) Patent No.: US 11,923,584 B2
(45) Date of Patent: Mar. 5, 2024

(54) MEMBRANE FOR REDOX FLOW BATTERY, METHOD FOR PRODUCING MEMBRANE FOR REDOX FLOW BATTERY, MEMBRANE ELECTRODE ASSEMBLY FOR REDOX FLOW BATTERY, CELL FOR REDOX FLOW BATTERY, AND REDOX FLOW BATTERY

(71) Applicant: ASAHI KASEI KABUSHIKI KAISHA, Tokyo (JP)

(72) Inventors: Hiroko Kamochi, Tokyo (JP); Yuka Kanada, Tokyo (JP); Kazuya Kai, Tokyo (JP); Junya Yamashita, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/800,033

(22) PCT Filed: Mar. 4, 2021

(86) PCT No.: PCT/JP2021/008480
§ 371 (c)(1),
(2) Date: Aug. 16, 2022

(87) PCT Pub. No.: WO2021/215126
PCT Pub. Date: Oct. 28, 2021

(65) Prior Publication Data
US 2023/0078901 A1  Mar. 16, 2023

(30) Foreign Application Priority Data

Apr. 24, 2020  (JP) .................... 2020-077754

(51) Int. Cl.
*H01M 8/18* (2006.01)
*H01M 4/88* (2006.01)
(Continued)

(52) U.S. Cl.
CPC ............ *H01M 8/188* (2013.01); *H01M 4/881* (2013.01); *H01M 4/96* (2013.01); *H01M 8/0289* (2013.01);
(Continued)

(58) Field of Classification Search
CPC ........ H01M 8/188; H01M 8/184; H01M 8/18; H01M 8/0289; H01M 4/881; H01M 4/96;
(Continued)

(56) References Cited

U.S. PATENT DOCUMENTS 6,764,789 B1  7/2004  Sekiguchi et al.
2008/0226960 A1  9/2008  Fukuta et al.
(Continued)

FOREIGN PATENT DOCUMENTS

CN  101383403 B  3/2011
CN  107210468 A  9/2017
(Continued)

OTHER PUBLICATIONS

International Search Report and Written Opinion of the International Searching Authority issued in International Patent Application No. PCT/JP2021/008480, dated Apr. 27, 2021, along with an English translation thereof.
(Continued)

*Primary Examiner* — Raymond Alejandro
(74) *Attorney, Agent, or Firm* — GREENBLUM & BERNSTEIN, P.L.C.

(57) ABSTRACT

An object of the present invention is to provide a membrane for a redox flow battery which is prevented from being curled and exhibits high power efficiency, a membrane electrode assembly for a redox flow battery, a cell for a redox flow battery, and a redox flow battery. The object can be attained by a membrane for a redox flow battery, comprising a first ion-exchange resin layer, an anion-exchange resin
(Continued)

layer containing an anion-exchange compound, and a second ion-exchange resin layer in the presented order, wherein a value obtained by dividing a thickness of the first ion-exchange resin layer by a thickness of the second ion-exchange resin layer is 0.7 or more and 1.3 or less, and a thickness of the anion-exchange resin layer is 0.02 µm or larger and 3 µm or smaller.

17 Claims, 1 Drawing Sheet

(51) Int. Cl.
  *H01M 4/96* (2006.01)
  *H01M 8/0289* (2016.01)
  *H01M 4/86* (2006.01)
(52) U.S. Cl.
  CPC ............ *H01M 2004/8684* (2013.01); *H01M 2004/8689* (2013.01)
(58) Field of Classification Search
  CPC ....... H01M 4/8803; H01M 2004/8684; H01M 2004/8689
  See application file for complete search history.

(56) References Cited

U.S. PATENT DOCUMENTS

| | | | |
|---|---|---|---|
| 2010/0291470 A1 | 11/2010 | Sadasue et al. | |
| 2012/0263990 A1 | 10/2012 | Kim | |
| 2013/0244135 A1* | 9/2013 | Yamane | H01M 8/1023 429/492 |
| 2016/0260988 A1* | 9/2016 | Miyazawa | H01M 8/1067 |
| 2017/0346124 A1 | 11/2017 | Lee et al. | |
| 2019/0036142 A1 | 1/2019 | Treger | |
| 2019/0051877 A1 | 2/2019 | Noda et al. | |
| 2019/0363385 A1 | 11/2019 | Lee et al. | |
| 2020/0330929 A1* | 10/2020 | Wang | H01M 8/188 |

FOREIGN PATENT DOCUMENTS

| | | |
|---|---|---|
| JP | 50-096472 A | 7/1975 |
| JP | 59-6472 A | 1/1984 |
| JP | 59-205165 A | 11/1984 |
| JP | 9-92321 A | 4/1997 |
| JP | 11-260390 A | 9/1999 |
| JP | 11-329474 A | 11/1999 |
| JP | 2001-167787 A | 6/2001 |
| JP | 2003-96219 A | 4/2003 |
| JP | 2011-233347 A | 11/2011 |
| JP | 2017-123225 A | 7/2017 |
| JP | 2018-26242 A | 2/2018 |
| JP | 2019-507006 A | 3/2019 |
| JP | 2019-512846 A | 5/2019 |
| JP | 2019-102225 A | 6/2019 |
| JP | 2019-518588 A | 7/2019 |
| WO | 2006/028292 A1 | 3/2006 |
| WO | 2009/081841 A1 | 7/2009 |

OTHER PUBLICATIONS

International Preliminary Report on Patentability in International Application No. PCT/JP2021/008480 dated Oct. 25, 2022.

* cited by examiner

[Figure 1]
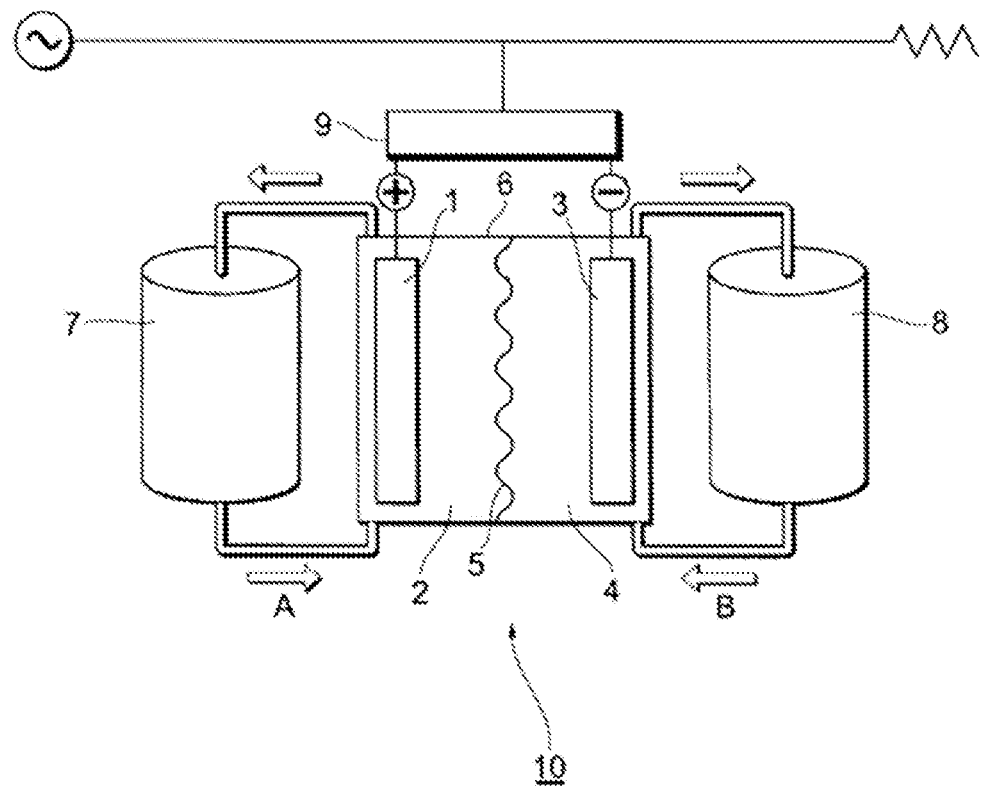
[Figure 2]
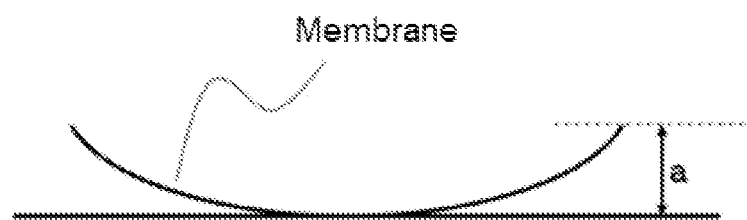

MEMBRANE FOR REDOX FLOW BATTERY, METHOD FOR PRODUCING MEMBRANE FOR REDOX FLOW BATTERY, MEMBRANE ELECTRODE ASSEMBLY FOR REDOX FLOW BATTERY, CELL FOR REDOX FLOW BATTERY, AND REDOX FLOW BATTERY

TECHNICAL FIELD

The present invention relates to a membrane for a redox flow battery, a method for producing a membrane for a redox flow battery, a membrane electrode assembly for a redox flow battery, a cell for a redox flow battery, and a redox flow battery.

BACKGROUND ART

Redox flow batteries are secondary batteries which store and discharge electricity, and are suitable for large stationary batteries for use in the equalization of electrical usage. The redox flow battery has a structure where a positive electrode and a positive electrode electrolyte solution containing a positive electrode active material (positive electrode cell) are separated from a negative electrode and a negative electrode electrolyte solution containing a negative electrode active material (negative electrode cell) through a membrane, and performs charge and discharge through the use of the oxidation-reduction reaction of both the active materials. High capacities are attained by circulating these electrolyte solutions containing the active materials to an electrolyzer from storage tanks.

For example, iron-chromium type, chromium-bromine type, zinc-bromine type, or vanadium type which exploits difference in charge is used as the active materials contained in the electrolyte solutions. Particularly, vanadium-type secondary batteries are under full-scale development because of their advantages such as high electromotive force, fast electrode reaction of vanadium ions, a small amount of hydrogen generated through side reaction, and high output.

The vanadium-type redox flow battery exploits the oxidation-reduction reaction between divalent ($V^{2+}$)/trivalent ($V^{3+}$) vanadium in the negative electrode cell and tetravalent ($V^{4+}$)/pentavalent ($V^{5+}$) vanadium in the positive electrode cell. Since the electrolyte solutions of the positive electrode cell and the negative electrode cell contain the same metal ion species as described above, the electrolyte solutions, even if mixed by membrane permeation, are recyclable through an electrical process and are thus less likely to cause serious problems as compared with other metal species. However, the permeation of an active material wastes stored charge and reduces current efficiency. Therefore, no permeation of such an active material is desirable. On the other hand, easy penetration of a proton which carries charge is desirable. Thus, there is a demand for membranes capable of achieving both high current efficiency and high voltage efficiency, i.e., high power efficiency.

Ion-exchange membranes may be processed in order to suppress the permeation of electrolyte ions and to achieve high power efficiency. Patent Literature 1 discloses an example of improving the suppression of permeation of vanadium ions by modifying the outermost surface of a membrane in a vanadium-type redox flow battery. Also, Patent Literature 2 discloses an example of exerting high power efficiency by alternately laminating a cation-exchange group layer and an anion-exchange group layer.

CITATION LIST

Patent Literature

Patent Literature 1: Japanese Translation of PCT International Application Publication No. 2019-507006
Patent Literature 2: Japanese Patent Laid-Open No. 11-260390

SUMMARY OF INVENTION

Technical Problem

In redox flow batteries, however, the processing of a membrane for improvement in current efficiency might impair proton conductivity and deteriorate voltage efficiency. The processing of Patent Literature 1 is still susceptible to improvement in power efficiency due to increase in membrane resistance.

In the case of laminating a cation-exchange layer with an anion-exchange layer, the resulting membrane might be curled due to the difference in the degree of swelling between the cation-exchange layer and the anion-exchange layer. At the time of evaluation of a redox flow battery, a membrane is dipped in sulfuric acid or an electrolyte solution and then incorporated in a cell for the battery. An easy-to-curl membrane may form space when incorporated in a cell, causing liquid leakage. For example, Patent Literature 2 has no mention about membrane curl, though disclosing improvement in battery characteristics by alternately laminating a cation-exchange layer and an anion-exchange layer.

An object of the present invention is to provide a membrane for a redox flow battery which is prevented from being curled and exhibits high power efficiency, a membrane electrode assembly for a redox flow battery, a cell for a redox flow battery, and a redox flow battery.

Another object of the present invention is to provide a membrane for a redox flow battery which sustains high power efficiency for a long period, a membrane electrode assembly for a redox flow battery, a cell for a redox flow battery, and a redox flow battery.

Solution to Problem

The present inventors have conducted diligent studies on the objects and have consequently found that formation of ion-exchange resin layers so as to sandwich an anion-exchange resin layer containing an anion-exchange compound enables to provide high power efficiency while preventing curl. The present inventors have further found that such arrangement of the ion-exchange resin layers so as to sandwich the anion-exchange resin layer can resist direct oxidation from electrolyte ions while suppressing the permeation of electrolyte ions, leading to higher long-term durability.

Specifically, embodiments of the present invention are as follows.

[1]
A membrane for a redox flow battery, comprising
a first ion-exchange resin layer,
an anion-exchange resin layer containing an anion-exchange compound, and
a second ion-exchange resin layer
in the presented order, wherein a value obtained by dividing a thickness of the first ion-exchange resin layer by a thickness of the second ion-exchange resin layer is 0.7 or more and 1.3 or less, and a thickness of the anion-exchange resin layer is 0.02 μm or larger and 3 μm or smaller.

[2]

The membrane for a redox flow battery according to [1], wherein each of the thicknesses of the first ion-exchange resin layer and the second ion-exchange resin layer is 5 μm or larger and 50 μm or smaller.

[3]

The membrane for a redox flow battery according to [1] or [2], wherein the first ion-exchange resin layer is a first ion-exchange resin layer containing a cation-exchange resin.

[4]

The membrane for a redox flow battery according to any of [1] to [3], wherein the second ion-exchange resin layer is a second ion-exchange resin layer containing a cation-exchange resin.

[5]

The membrane for a redox flow battery according to [3] or [4], wherein the cation-exchange resin comprises a fluorine-type high-molecular electrolyte polymer.

[6]

The membrane for a redox flow battery according to any of [1] to [5], wherein the anion-exchange compound has a tertiary amino group or a quaternary ammonium group.

[7]

A method for producing a membrane for a redox flow battery, the membrane comprising a first ion-exchange resin layer, an anion-exchange resin layer, and a second ion-exchange resin layer in the presented order, the method comprising the steps of:

forming the anion-exchange resin layer on the first ion-exchange resin layer to obtain a first ion-exchange resin layer/anion-exchange resin layer construct; and forming the second ion-exchange resin layer on the anion-exchange resin layer of the construct.

[8]

A method for producing a membrane for a redox flow battery, the membrane comprising a first ion-exchange resin layer, an anion-exchange resin layer, and a second ion-exchange resin layer in the presented order, the method comprising the steps of:

forming the anion-exchange resin layer on the first ion-exchange resin layer to obtain a first ion-exchange resin layer/anion-exchange resin layer construct;

forming the anion-exchange resin layer on the second ion-exchange resin layer to obtain a second ion-exchange resin layer/anion-exchange resin layer construct; and laminating the first ion-exchange resin layer/anion-exchange resin layer construct and the second ion-exchange resin layer/anion-exchange resin layer construct at surfaces of their respective anion-exchange resin layers, followed by adhesion by heat press.

[9]

A membrane electrode assembly for a redox flow battery, comprising the membrane for a redox flow battery according to any of [1] to [6], and a carbon electrode assembled with the membrane for a redox flow battery.

[10]

A cell for a redox flow battery, comprising the membrane electrode assembly according to [9].

[11]

A redox flow battery comprising an electrolyzer, the electrolyzer comprising: a positive electrode cell chamber comprising a positive electrode consisting of a carbon electrode; a negative electrode cell chamber comprising a negative electrode consisting of a carbon electrode; and a membrane that separates the positive electrode cell chamber and the negative electrode cell chamber, wherein the positive electrode cell chamber comprises a positive electrode electrolyte solution comprising an active material, the negative electrode cell chamber comprises a negative electrode electrolyte solution comprising an active material, and the membrane is the membrane for a redox flow battery according to any of [1] to [6].

Advantageous Effects of Invention

The present invention can provide a membrane for a redox flow battery which is prevented from being curled and exhibits high power efficiency, a membrane electrode assembly for a redox flow battery, a cell for a redox flow battery, and a redox flow battery.

The present invention can also provide a membrane for a redox flow battery which sustains high power efficiency for a long period, a membrane electrode assembly for a redox flow battery, a cell for a redox flow battery, and a redox flow battery.

BRIEF DESCRIPTION OF DRAWINGS

FIG. 1 shows one example of a schematic view of a redox flow battery comprising the membrane for a redox flow battery according to the present embodiment.

FIG. 2 is a schematic diagram of a method for evaluating curl.

DESCRIPTION OF EMBODIMENTS

Hereinafter, the mode for carrying out the present invention (hereinafter, referred to as the "present embodiment") will be described in detail. However, the present invention is not limited by the description given below and can be carried out through various changes or modification made without departing from the spirit of the present invention.

[Membrane for Redox Flow Battery]

The membrane for a redox flow battery (hereinafter, also simply referred to as the "membrane") of the present embodiment comprises a first ion-exchange resin layer, an anion-exchange resin layer containing an anion-exchange compound, and a second ion-exchange resin layer in the presented order. A value obtained by dividing a thickness of the first ion-exchange resin layer by a thickness of the second ion-exchange resin layer is 0.7 or more and 1.3 or less. A thickness of the anion-exchange resin layer is 0.02 μm or larger and 3 μm or smaller.

The movement of an active material (e.g., a vanadium ion) can be drastically suppressed without largely impairing proton movement between positive and negative electrodes, by controlling the thickness of the anion-exchange resin layer within the range described above. As a result, current efficiency can be enhanced while voltage efficiency is maintained. Therefore, high power efficiency can be obtained. The 3-layer structure where the anion-exchange resin layer is sandwiched between the first and second ion-exchange resin layers can avoid direct contact between the anion-exchange resin layer and a highly corrosive electrolyte solution. This can suppress the degradation of the anion-exchange resin layer even in long-term operation and maintain high power efficiency. In addition, the internal stress distribution in the thickness direction of the membrane can be decreased by controlling the value obtained by dividing a thickness of the first ion-exchange resin layer by a thickness of the second ion-exchange resin layer within the range described above. The resulting membrane can be prevented from being curled.

The value obtained by dividing a thickness of the first ion-exchange resin layer by a thickness of the second ion-exchange resin layer is preferably 0.8 or more and 1.2 or less, more preferably 0.85 or more and 1.15 or less, further preferably 0.9 or more and 1.1 or less.

Examples of the method for adjusting the value obtained by dividing a thickness of the first ion-exchange resin layer by a thickness of the second ion-exchange resin layer to 0.7 or more and 1.3 or less include a method of adjusting the amount of coating in film formation.

The thickness of each layer in the membrane of the present embodiment, and the thickness of the membrane can be measured by methods described in Examples.

The ion-exchange resin layer according to the present embodiment refers to a layer having a function of permitting passage of protons or anions while suppressing the passage of active material ions.

The membrane of the present embodiment may have an additional layer different from the layers mentioned above. Examples of the additional layer include, but are not particularly limited to, porous layers that supplement the strength of the membrane.

The membrane of the present embodiment comprises at least a first ion-exchange resin layer, an anion-exchange resin layer, and a second ion-exchange resin layer. The membrane according to one embodiment may comprise a first ion-exchange resin layer, a first anion-exchange resin layer, a second ion-exchange resin layer, a second anion-exchange resin layer, and a third ion-exchange resin layer in the presented order.

<First Ion-Exchange Resin Layer>

Examples of the first ion-exchange resin layer include, but are not particularly limited to, cation-exchange resins.

Examples of the cation-exchange resin include, but are not particularly limited to, fluorine-type high-molecular electrolyte polymers. The fluorine-type high-molecular electrolyte polymer includes a perfluorocarbon polymer having an ion-change group.

Examples of the ion-exchange group include, but are not particularly limited to, a —COOH group, a —SO$_3$H group, a —PO$_3$H$_2$ group and their salts. Examples of the salt include, but are not particularly limited to, alkali metal salts, alkaline earth metal salts, and amine salts.

The perfluorocarbon polymer preferably has a structure represented by the following formula (1):

$$-[CF_2-CX^1X^2]_a-[CF_2-CF(-O_c-(CF_2-CF(CF_2X^3))_b-O_c-(CFR^1)_d-(CFR^2)_e-(CF_2)_f-X^4)]_g- \quad (1)$$

$X^1$, $X^2$, $X^3$, $X^4$, $R^1$, $R^2$ and a to g in the formula (1) are each defined as follows.

$X^1$, $X^2$ and $X^3$ are each independently a halogen atom or a perfluoroalkyl group having 1 to 3 carbon atoms.

Examples of the halogen atom include, but are not particularly limited to, a fluorine atom, a chlorine atom, a bromine atom, and an iodine atom. Examples of the perfluoroalkyl group having 1 to 3 carbon atoms include, but are not particularly limited to, a trifluoromethyl group, a pentafluoroethyl group, a perfluoro-n-propyl group, and a perfluoroisopropyl group.

$X^1$, $X^2$ and $X^3$ are each independently preferably a fluorine atom or a perfluoroalkyl group having 1 to 3 carbon atoms, more preferably a fluorine atom, from the viewpoint of the chemical stability, such as oxidative degradation resistance, of the polymer.

$X^4$ is a —COOZ group, a —SO$_3$Z group, a —PO$_3$Z$_2$ group or a —PO$_3$HZ group.

Z is a hydrogen atom, an alkali metal atom, an alkaline earth metal atom, NH$_4$, NH$_3$R$^{11}$, NH$_2$R$^{11}$R$^{12}$, NHR$^{11}$R$^{12}$R$^{13}$, or NR$^{11}$R$^{12}$R$^{13}$R$^{14}$.

In this context, $R^{11}$, $R^{12}$, $R^{13}$ and $R^{14}$ are each independently an alkyl group or an aryl group. The alkyl group represented by $R^{11}$, $R^{12}$, $R^{13}$ or $R^{14}$ is preferably an alkyl group having 1 to 6 carbon atoms, more preferably a methyl group, an ethyl group, a n-propyl group, an isopropyl group, a n-butyl group, a sec-butyl group, an isobutyl group, or a n-hexyl group. Examples of the aryl group include, but are not particularly limited to, a phenyl group and a naphthyl group.

When $X^4$ is a —PO$_3$Z$_2$ group, the Z moieties may be the same or different. Examples of the alkali metal atom include, but are not particularly limited to, a lithium atom, a sodium atom, and a potassium atom. Examples of the alkaline earth metal atom include, but are not particularly limited to, a calcium atom and a magnesium atom. $X^4$ is preferably SO$_3$Z from the viewpoint of the chemical stability, such as oxidative degradation resistance, of the polymer.

$R^1$ and $R^2$ are each independently a halogen atom, a perfluoroalkyl group having 1 to 10 carbon atoms or a fluorochloroalkyl group. In this context, Examples of the halogen atom represented by $R^1$ or $R^2$ include, but are not particularly limited to, a fluorine atom, a chlorine atom, a bromine atom, an iodine atom. Among them, a fluorine atom is preferred.

a and g are numbers satisfying 0≤a<1, 0<g≤1, and a+g=1. b is an integer of 0 to 8. c is 0 or 1. d, e and f are each independently an integer of 0 to 6. However, d, e and f are not 0 at the same time.

The order of arrangement of the structural unit of [CF$_2$—CX$^1$X$^2$] and the structural unit of [CF$_2$—CF(—O—(CF$_2$—CF(CF$_2$X$^3$))$_b$—O$_c$—(CFR$^1$)$_d$—(CFR$^2$)$_e$—(CF$_2$)$_f$—X$^4$)] is not particularly limited and may be random or may be a block.

The perfluorocarbon polymer according to the present embodiment is preferably perfluorocarbon sulfonic acid resin (hereinafter, also referred to as "PFSA resin") because the advantageous effects of the present embodiment tend to be more marked. The PFSA resin according to the present embodiment is a resin in which perfluorocarbon as a side chain and one or two or more sulfonic acid groups (optionally, some of which may be in the form of a salt) per side chain are bonded to the backbone consisting of a PTFE skeletal chain.

The PFSA resin preferably contains a repeat unit represented by —[CF$_2$CF$_2$]— and a repeat unit derived from a compound represented by the following formula (3), (4-1) or (4-2):

$$CF_2=CF(-O-(CF_2CFXO)_n-[A]) \quad (3)$$

wherein X is F or a perfluoroalkyl group having 1 to 3 carbon atoms, n is an integer of 0 to 5, [A] is $(CF_2)_m-SO_3H$, and m is an integer of 0 to 6, provided that n and m are not 0 at the same time.

$$CF_2=CF-O-(CF_2)_P-CFX(-O-(CF_2)K-SO_3H) \quad (4\text{-}1)$$

$$CF_2=CF-O-(CF_2)_P-CFX(-(CF_2)_L-O-(CF_2)_m-SO_3H) \quad (4\text{-}2)$$

wherein X is a perfluoroalkyl group having 1 to 3 carbon atoms, P is an integer of 0 to 12, K is an integer of 1 to 5, L is an integer of 1 to 5, and m is an integer of 0 to 6, provided that K and L are the same or different and P, K, and L are not 0 at the same time.

The PFSA resin is more preferably a copolymer comprising a repeat unit represented by $-[CF_2CF_2]-$ and a repeat unit represented by $-[CF_2-CF(-O-(CF_2CFXO)_n-(CF_2)_m-SO_3H)]-$ (wherein X is F or $CF_3$, n is an integer of 0 to 5, and m is an integer of 0 to 12, provided that n and m are not 0 at the same time), the copolymer comprising at least one repeat unit represented by $-[CF_2-CF(-O-(CF_2CFXO)_n-(CF_2)_m-SO_3H)]-$ (wherein X is $CF_3$, n is 0 or 1, and m is an integer of 0 to 12, provided that n and m are not 0 at the same time). When the PFSA resin is a copolymer having the structure and has the predetermined equivalent weight EW, the resulting membrane tends to have sufficient hydrophilicity and have strong resistance to an electrolyte solution active material, for example, pentavalent vanadium.

When the PFSA resin comprises the repeat unit represented by $-[CF_2-CF(-O-(CF_2CFXO)_n-(CF_2)_m-SO_3H)]-$ (wherein X is $CF_3$, n is 0, and m is an integer of 1 to 6), or both the repeat units of $-[CF_2-CF(-O-(CF_2)_P-CFX(-O-(CF_2)_K-SO_3H))]-$ and $-[CF_2-CFX(-O-(CF_2)_P-CFX(-(CF_2)_L-O-(CF_2)_m-SO_3H))]-$ derived from the compound represented by the formula (4-1) and the compound represented by the formula (4-2), respectively, the resulting membrane tends to have high hydrophilicity because of a low equivalent weight (EW).

The perfluorocarbon polymer represented by the formula (1) according to the present embodiment more preferably has a structure represented by the following formula (2) because the advantageous effects of the present embodiment tend to be more marked:

$$-[CF_2CF_2]_a-[CF_2-CF(-O-(CF_2)_m-SO_3H)]_g- \quad (2)$$

In the formula (2), a and g are numbers satisfying $0 \leq a < 1$, $0 < g \leq 1$, and $a+g=1$, and m is an integer of 1 to 6.

The perfluorocarbon polymer according to the present embodiment is not particularly limited as long as the perfluorocarbon polymer has the structure represented by the formula (1) or the formula (2). The perfluorocarbon polymer may have an additional structure.

The perfluorocarbon polymer according to the present embodiment may be subjected to intermolecular partial cross-linking reaction directly or indirectly through the ion-exchange group, from the viewpoint of controlling solubility or swellability. The partial cross-linking thus performed can reduce the water solubility (improve the water resistance) of the perfluorocarbon polymer, for example, even if the equivalent weight EW of the perfluorocarbon polymer is on the order of 500 g/eq.

When the perfluorocarbon polymer has a low melt flow value (has a high molecular weight), the partial cross-linking can also reduce solubility or excessive swellability by increasing intermolecular entanglement.

Examples of the partial cross-linking reaction include the reaction of the ion-exchange group with a functional group or the backbone of another molecule, the reaction between ion-exchange groups, and cross-linking reaction (covalent bond) via an oxidation-resistant low-molecular compound, oligomer or high-molecular substance, etc. In some cases, the partial cross-linking reaction may be reaction with a salt (including an ion bond with a $-SO_3H$ group)-forming substance. Examples of the oxidation-resistant low-molecular compound, oligomer or high-molecular substance include polyhydric alcohols and organic diamines.

The molecular weight of the perfluorocarbon polymer according to the present embodiment is not particularly limited and is preferably 0.05 g/10 min or more and 50 g/10 min or less, more preferably 0.1 g/10 min or more and 30 g/10 min or less, further preferably 0.5 g/10 min or more and 20 g/10 min or less, in terms of the value of melt flow index (MFI) measured in accordance with ASTM: D1238 (measurement conditions: temperature: 270° C., load: 2160 g).

(Equivalent weight EW)

The cation-exchange resin has equivalent weight EW of the ion-exchange group of 450 g/eq or more and 2000 g/eq or less from the viewpoint of suppressing the permeation of an active material ion and improving power efficiency and from the viewpoint of improving proton conductivity and reducing resistance.

The equivalent weight EW of the cation-exchange resin used in the present embodiment is more preferably 500 g/eq or more, further preferably 600 g/eq or more, still further preferably 700 g/eq or more, from the viewpoint of suppressing the permeation of an active material ion and improving power efficiency. The equivalent weight EW of the cation-exchange resin used in the present embodiment is more preferably 1700 g/eq or less, further preferably 1500 g/eq or less, still further preferably 1200 g/eq or less, from the viewpoint of improving proton conductivity and reducing resistance.

The equivalent weight EW of the cation-exchange resin is preferably 450 g/eq or more and 2000 g/eq or less, more preferably 500 g/eq or more and 1700 g/eq or less, further preferably 600 g/eq or more and 1500 g/eq or less, still further preferably 700 g/eq or more and 1200 g/eq or less.

The equivalent weight EW means the dry mass (g) of the cation-exchange resin per equivalent of the ion-exchange group.

The equivalent weight EW of the cation-exchange resin can be measured by substituting the perfluorocarbon polymer with a salt, and back-titrating the solution against an alkali solution.

The equivalent weight EW can be adjusted by the copolymerization ratio of a monomer which is a starting material of the cation-exchange resin, a selected monomer species, etc.

The ratio of change in dimension of the first ion-exchange resin layer in at least one of an X direction and a Y direction is preferably 100% or more in the following ratio of change in dimension by dipping in 2 M aqueous sulfuric acid solution:

<ratio of change in dimension by dipping in 2 M aqueous sulfuric acid solution>

A membrane for testing having the same composition as that of the first ion-exchange resin layer and a water content of 1% or less is prepared; the membrane for testing is dipped in a 2 M aqueous sulfuric acid solution at 25° C. for 30 minutes; and ratios of change in dimension in an X direction on a surface of the membrane for testing and a Y direction orthogonal to the X direction are calculated according to the following expression:

Ratio of change in dimension (%)={(Dimension in a specific direction after the dipping)/(Dimension in the specific direction before the dipping)}× 100.

The ratio of change in dimension of the first ion-exchange resin layer in at least one of an X direction and a Y direction is preferably 100% or more, and a ratio of change in dimension thereof in a Z direction is preferably less than 115%, in the following ratio of change in dimension by dipping in distilled water:

<ratio of change in dimension by dipping in distilled water>

A membrane for testing having the same composition as that of the first ion-exchange resin layer and a water content of 1% or less is prepared; the electrolyte membrane for testing is dipped in distilled water at 25° C. for 30 minutes; and ratios of change in dimension in an X direction on a surface of the membrane for testing, a Y direction orthogonal to the X direction, and a Z direction orthogonal to the X direction and the Y direction are calculated:

Ratio of change in dimension (%)={(Dimension in a specific direction after the dipping)/(Dimension in the specific direction before the dipping)}× 100.

(Method for Producing Cation-Exchange Resin)

The cation-exchange resin according to the present embodiment can be obtained, for example, but not particularly limited to, by producing a precursor of the cation-exchange resin having an ion-exchange group (hereinafter, also referred to as a "resin precursor"), followed by hydrolysis treatment thereof.

The PFSA resin is obtained, for example, by hydrolyzing a PFSA resin precursor consisting of a copolymer of a vinyl ether fluoride compound represented by the following formula (6) or (7) and an olefin fluoride monomer represented by the following formula (8)

$$CF_2=CF-O-(CF_2CFXO)_n\text{-}A \quad (6)$$

wherein X is F or a perfluoroalkyl group having 1 to 3 carbon atoms, n is an integer of 0 to 5, A is $(CF_2)_m$—W wherein m is an integer of 0 to 6, n and m are not 0 at the same time, and W is a functional group capable of being converted to a —$SO_3H$ group by hydrolysis.

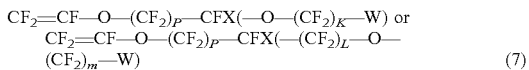

$$CF_2=CF-O-(CF_2)_P-CFX(-O-(CF_2)_K-W) \text{ or}$$
$$CF_2=CF-O-(CF_2)_P-CFX(-(CF_2)_L-O-(CF_2)_m-W) \quad (7)$$

wherein X is a perfluoroalkyl group having 1 to 3 carbon atoms, P is an integer of 0 to 12, K is an integer of 1 to 5, L is an integer of 1 to 5 wherein L, K and m are not 0 at the same time, m is an integer of 0 to 6, and W is a functional group capable of being converted to a —$SO_3H$ group by hydrolysis.

$$CF_2=CFZ \quad (8)$$

wherein Z is H, Cl, F, a perfluoroalkyl group having 1 to 3 carbon atoms, or a cyclic perfluoroalkyl group optionally containing oxygen as a ring-constituting atom.

Examples of W in the formula (6) and the formula (7) include, but are not particularly limited to, a —$SO_2F$ group, a —$SO_2Cl$ group, and a —$SO_2Br$ group. In the formula (6) and the formula (7), preferably, X is $CF_3$, and W is —$SO_2F$ group. In the formula (8), Z is preferably F. Among others, n=0, m=an integer of 1 to 6, X=$CF_3$, W=a-$SO_2F$ group, and Z=F are more preferred because a solution having high hydrophilicity and a high resin concentration tends to be obtained.

The resin precursor according to the present embodiment can be synthesized by an approach known in the art. The resin precursor can be produced, for example, by polymerizing a vinyl fluoride compound having a group capable of being converted to an ion-exchange group ($X^4$ in the formula (1)) (ion-exchange group precursor group) by hydrolysis or the like, and olefin fluoride such as tetrafluoroethylene (hereinafter, also referred to as "TFE") in the presence of a radical-generating agent such as a peroxide. Examples of the polymerization method that can be used include, but are not particularly limited to, a polymerization method of adding and dissolving the vinyl fluoride compound and a gas of the olefin fluoride in a polymerization solvent such as fluorine-containing hydrocarbon, followed by reaction (solution polymerization), a polymerization method of using the vinyl fluoride compound itself as a polymerization solvent without the use of a solvent such as fluorine-containing hydrocarbon (bulk polymerization), a polymerization method of adding the vinyl fluoride compound and a gas of the olefin fluoride to an aqueous solution of a surfactant as a medium, followed by reaction (emulsion polymerization), a polymerization method of adding and emulsifying the vinyl fluoride compound and a gas of the olefin fluoride in an aqueous solution of a surfactant and an emulsification aid such as an alcohol, followed by reaction (emulsion polymerization), and a polymerization method of adding and suspending the vinyl fluoride compound and a gas of the olefin fluoride in an aqueous solution of a suspension stabilizer, followed by reaction (suspension polymerization).

The resin precursor according to the present embodiment can be prepared by any of the polymerization methods mentioned above for use. Alternatively, a block or tapered polymer obtained by adjusting polymerization conditions such as the amount of TFE gas supplied may be used as the resin precursor.

The resin precursor may have a fluorinated moiety of an impure end or a structurally easy-to-oxidize moiety (a CO group, a H bond moiety, etc.) generated in the molecular structure of the resin during polymerization reaction, through treatment with fluorine gas by a method known in the art.

In the resin precursor, some ion-exchange group precursor groups (e.g., —$SO_2F$ groups) may be partially (including intermolecularly) imidized (alkyl-imidized, etc.).

The molecular weight of the resin precursor is not particularly limited and is preferably 0.05 g/10 min or more and 50 g/10 min or less, more preferably 0.1 g/10 min or more and 30 g/10 min or less, further preferably 0.5 g/10 min or more and 20 g/10 min or less, in terms of the value of melt flow index (MFI) of the precursor measured in accordance with ASTM: D1238 (measurement conditions: temperature: 270° C., load: 2160 g).

The shape of the resin precursor is not particularly limited and is preferably, for example, 0.5 cm³ or smaller pellets, a dispersion, or powder particles from the viewpoint of accelerating the treatment rates of hydrolysis treatment and acid treatment mentioned later. Among others, a powder after polymerization is more preferably used. A membrane-shaped resin precursor obtained by extrusion molding may be used from the viewpoint of cost.

The method for producing the perfluorocarbon polymer according to the present embodiment from the resin precursor is not particularly limited and is, for example, a method of extrusion-molding the resin precursor through a nozzle or a die, etc., using an extruder, followed by hydrolysis treatment, or subjecting a polymerization product itself, i.e., a dispersion, or a precipitated or filtered powder thereof to hydrolysis treatment.

Specifically, the resin precursor obtained as described above and, if necessary, molded can subsequently be dipped in a basic reaction liquid and subjected to hydrolysis treatment. Examples of the basic reaction liquid for use in hydrolysis treatment include, but are not particularly limited to, aqueous solutions of amine compounds such as dimethylamine, diethylamine, monomethylamine and monoethylamine, and aqueous solutions of hydroxides of alkali metals or alkaline earth metals. Among them, an aqueous solution of sodium hydroxide or potassium hydroxide is preferred. In the case of using a hydroxide of an alkali metal or an alkaline earth metal, its content is not particularly limited and is preferably 10% by mass or more and 30% by mass or less with respect to the whole reaction liquid. The reaction liquid more preferably further contains a swellable organic compound such as methyl alcohol, ethyl alcohol, acetone or dimethyl sulfoxide (DMSO). The content of the swellable organic compound is preferably 1% by mass or more and 30% by mass or less with respect to the whole reaction liquid.

The resin precursor thus subjected to hydrolysis treatment in a basic reaction liquid is thoroughly washed with water such as hot water, followed by acid treatment. Examples of the acid for use in acid treatment include, but are not particularly limited to, mineral acids such as hydrochloric acid, sulfuric acid, and nitric acid, and organic acids such as oxalic acid, acetic acid, formic acid, and trifluoroacetic acid. A mixture of such an acid and water is preferred. These acids may each be used singly, or two or more thereof may be used in combination. The basic reaction liquid used in hydrolysis treatment may be removed in advance by treatment with a cation-exchange resin or the like before acid treatment.

The acid treatment protonates the ion-exchange group precursor group of the resin precursor to generate an ion-exchange group. In the case of, for example, a resin precursor produced according to the formula (6), W in the formula (6) is protonated into a —$SO_3H$ group by the acid treatment. The perfluorocarbon polymer obtained by hydrolysis and acid treatment becomes dispersible or soluble in a protic organic solvent or water, or a mixed solvent thereof and can be prepared into a suspension or a solution.

The perfluorocarbon polymer may contain an alkali metal, an alkaline earth metal, or any other radical-degradable transition metal (a Ce compound, a Mn compound, etc.) in the form of a partial salt therewith (on the order of 0.01 to 5% of the total equivalent of ion-exchange groups) or in a form used singly or in combination with a basic polymer mentioned later.

The membrane of the present embodiment preferably comprises a mixture of two or more types of perfluorocarbon polymers each having an ion-exchange group and differing in monomer structure, from the viewpoint of more favorable electric resistance and mechanical strength.

The two or more types of perfluorocarbon polymers thus mixed are capable of exhibiting excellent characteristics in which their respective functions are integrated.

For mixing the two or more types of perfluorocarbon polymers, the ratio of a polymer having higher equivalent weight EW is preferably larger than 50% by mass, more preferably larger than 55% by mass, further preferably larger than 60% by mass, from the viewpoint of more favorable mechanical strength. The polymer having higher equivalent weight EW tends to have higher crystalline nature and therefore tends to exert higher mechanical strength at the above ratio.

(Method for Producing Raw Material Membrane of Perfluorocarbon Polymer)

The raw material membrane for use in the production of the membrane of the present embodiment is obtained by processing the precursor resin or the perfluorocarbon polymer into a film by a method known in the art. For example, a method can be used which involves melt-kneading the precursor of the perfluorocarbon polymer mentioned above, and then forming a film using an extruder, followed by hydrolysis to form an ion-exchange group. Alternatively, the perfluorocarbon polymer may be temporarily dispersed in a solvent, and a film can then be formed on a base material by cast film production.

The content of the cation-exchange resin is preferably 70% by mass or more, more preferably 80% by mass or more, further preferably 90% by mass or more, in the first ion-exchange resin layer. The content of the cation-exchange resin is, for example, 100% by mass or less, in the first ion-exchange resin layer.

The thickness of the first ion-exchange resin layer is preferably 5 μm or larger, more preferably 8 μm or larger, further preferably 10 μm or larger. When the thickness of the first ion-exchange resin layer is 5 μm or larger, high proton conductivity can be retained and high power efficiency can be exerted. In addition, short circuit ascribable to the puncture of an electrode can be prevented. The thickness is preferably 50 μm or smaller, more preferably 30 μm or smaller, further preferably 20 μm or smaller. When the thickness of the first ion-exchange resin layer is 50 μm or smaller, the size of an apparatus can be decreased because a thinner membrane can be configured. The thickness of the first ion-exchange resin layer is preferably 5 μm or larger and 50 μm or smaller, more preferably 8 μm or larger and 30 μm or smaller, further preferably 10 μm or larger and 20 μm or smaller.

<Anion-Exchange Resin Layer>

The membrane of the present embodiment has an anion-exchange resin layer containing an anion-exchange compound. The presence of the anion-exchange resin layer can improve performance as a battery in such a way that this layer can improve initial power efficiency. In this context, the anion-exchange compound is a compound that has a basic functional group such as a primary to tertiary amino group or a quaternary ammonium group in the molecular structure and is positively charged under an acidic condition of at least pH=1.

The presence of the anion-exchange resin layer imparts internal electrostatic repulsion against electrolyte ions to the membrane, can selectively allow a proton having a low charge density to permeate the membrane while eliminating a metal ion having a high charge density to the outside of the membrane, and can improve power efficiency.

The anion-exchange compound preferably has a tertiary amino group or a quaternary ammonium group from the viewpoint of maintaining high power efficiency.

Examples of the anion-exchange compound include, but are not particularly limited to: anion-exchange polymers such as polyvinylpyridine polymers and salts thereof, vinylpyridine/divinylbenzene copolymers and salts thereof, vinylpyridine/styrene copolymers and salts thereof, polyethyleneimine and salts thereof, vinyl benzyl trimethylammonium chloride polymers, vinyl benzyl trimethylammonium chloride/divinylbenzene copolymers, vinyl benzyl trimethylammonium chloride/styrene copolymers, polybenzimidazole and salts thereof, polymers having a benzimidazole structure and salts thereof, and polypyrrole and salts thereof; and tetrabutylammonium, octyl trimethylammonium, decyl trimethylammonium, tetradecyl trimethylammonium, dodecyl trimethylammonium, dodecyl dimethyl benzylammonium, cetyl trimethylammonium, stearyl trimethylammonium, butylpyridinium, dodecylpyridinium, cetylpyridinium, trimethylamine and salts thereof, triethylamine and salts thereof, tripropylamine and salts thereof, trioctylamine and salts thereof, triethanolamine and salts thereof, and N,N,N',N'-tetramethylbutanediamine and salts thereof. The anion-exchange polymer may be obtained by applying a monomer such as pyrrole to the first ion-exchange resin layer, followed by polymerization by heat treatment or the like. The anion-exchange compound is preferably an anion-exchange polymer and preferably lacks a cation-exchange group such as a sulfonic acid group or a carboxylic acid group.

The weight-average molecular weight of the anion-exchange polymer is preferably 10,000 or higher, more preferably 20,000 or higher, further preferably 30,000 or higher. The weight-average molecular weight of the anion-exchange polymer is preferably 300,000 or lower, more preferably 200,000 or lower, further preferably 100,000 or lower. The weight-average molecular weight of the anion-exchange polymer is preferably 10,000 or higher and 300,000 or lower, more preferably 20,000 or higher and 200,000 or lower, further preferably 30,000 or higher and 100,000 or lower. The weight-average molecular weight is a value measured by gel permeation chromatography.

(Method for Forming Anion-Exchange Resin Layer)

Examples of the method for forming the anion-exchange resin layer include, but are not particularly limited to, a method of coating the first ion-exchange resin layer with a liquid containing the anion-exchange compound or an anionic polymer-forming monomer dissolved or melted therein, and a method of thermally pressure-bonding the anion-exchange resin layer containing the anion-exchange compound onto the first ion-exchange resin layer.

The content of the anion-exchange compound is preferably 70% by mass or more, more preferably 80% by mass or more, further preferably 90% by mass or more, in the anion-exchange resin layer. The content of the anion-exchange compound is, for example, 100% by mass or less, in the anion-exchange resin layer.

The thickness of the anion-exchange resin layer is 0.02 µm or larger, preferably 0.05 µm or larger, more preferably 0.1 µm or larger. When the thickness of the anion-exchange resin layer is 0.02 µm or larger, the permeation of an active material (e.g., a vanadium ion) can be suppressed and initial power efficiency can be improved. As a result, power efficiency is improved. When the thickness of the anion-exchange resin layer is 0.05 µm or larger, power efficiency in long-term operation can be further improved. The thickness of the anion-exchange resin layer is 3.0 µm or smaller, preferably 2.5 µm or smaller, more preferably 2.0 µm or smaller, further preferably 1.0 µm or smaller. When the thickness of the anion-exchange resin layer is 3.0 µm or smaller, high power efficiency is obtained. When the thickness of the anion-exchange resin layer is 3.0 µm or smaller, high power efficiency can be maintained in long-term operation without drastically impairing proton conductivity. When the thickness of the anion-exchange resin layer is 2.5 µm or smaller, the permeation of an active material (e.g., a vanadium ion) can be suppressed without impairing proton conductivity. When the thickness of the anion-exchange resin layer is 0.02 µm or larger and 3.0 µm or smaller, the membrane tends to be able to be prevented from being curled. The thickness of the anion-exchange resin layer is 0.02 µm or larger and 3.0 µm or smaller, preferably 0.05 µm or larger and 2.5 µm or smaller, more preferably 0.1 µm or larger and 2.0 µm or smaller, further preferably 0.1 µm or larger and 1.0 µm or smaller.

<Second Ion-Exchange Resin Layer>

Examples of the second ion-exchange resin layer include, but are not particularly limited to, cation-exchange resins.

The type of the cation-exchange resin contained in the second ion-exchange resin layer and the content thereof are the same as the examples in the first ion-exchange resin layer and the preferred aspects thereof. The thickness of the second ion-exchange resin layer is the same as the preferred range in the first ion-exchange resin layer.

The thickness of the membrane of the present embodiment is preferably 10 µm or larger, more preferably 15 µm or larger, further preferably 20 µm or larger. When the thickness of the membrane is 10 µm or larger, the corrosion of the membrane by an electrolyte can be suppressed and power efficiency in long-term operation can be further improved. In addition, short circuit ascribable to the puncture of an electrode can be prevented. The thickness of the membrane is preferably 100 µm or smaller, more preferably 60 µm or smaller, further preferably 40 µm or smaller. When the thickness of the membrane is 100 µm or smaller, the size of an apparatus can be decreased because a thinner membrane can be configured. The thickness of the membrane is preferably 10 µm or larger and 100 µm or smaller, more preferably 15 µm or larger and 60 µm or smaller, further preferably 20 µm or larger and 40 µm or smaller.

The membrane of the present embodiment comprises the first ion-exchange resin layer, the anion-exchange resin layer, and the second ion-exchange resin layer in the presented order and can be produced by laminating these layers in the presented order. The present embodiment provides a method for producing a membrane for a redox flow battery, the membrane comprising a first ion-exchange resin layer, an anion-exchange resin layer, and a second ion-exchange resin layer in the presented order, the method comprising the steps of: forming the anion-exchange resin layer on the first ion-exchange resin layer to obtain a first ion-exchange resin layer/anion-exchange resin layer construct; and forming the second ion-exchange resin layer on the anion-exchange resin layer of the construct.

The membrane of the present embodiment may be produced by laminating two such ion-exchange resin layer/anion-exchange resin layer constructs. Thus, the present embodiment provides a method for producing a membrane for a redox flow battery, the membrane comprising a first ion-exchange resin layer, an anion-exchange resin layer, and a second ion-exchange resin layer in the presented order, the method comprising the steps of: forming the anion-exchange resin layer on the first ion-exchange resin layer to obtain a first ion-exchange resin layer/anion-exchange resin layer construct; forming the anion-exchange resin layer on the second ion-exchange resin layer to obtain a second ion-exchange resin layer/anion-exchange resin layer construct; and laminating the first ion-exchange resin layer/anion-exchange resin layer construct and the second ion-exchange resin layer/anion-exchange resin layer construct at surfaces of their respective anion-exchange resin layers, followed by adhesion by heat press.

The membrane of the present embodiment is used in a redox flow battery.

The membrane of the present embodiment exhibits excellent battery performance, particularly, in a use method of incorporating a dry membrane into a cell.

[Redox Flow Battery]

FIG. 1 shows one example of a schematic view of a redox flow battery comprising the membrane for a redox flow battery of the present embodiment. Redox flow battery 10 of the present embodiment has electrolyzer 6 comprising: positive electrode cell chamber 2 comprising positive electrode 1 consisting of a carbon electrode; negative electrode cell chamber 4 comprising negative electrode 3 consisting of a carbon electrode; and membrane 5 as a membrane that separates the positive electrode cell chamber 2 and the negative electrode cell chamber 4. The positive electrode cell chamber 2 contains a positive electrode electrolyte solution comprising an active material. The negative electrode cell chamber 4 contains a negative electrode electrolyte solution comprising an active material. The positive electrode electrolyte solution and the negative electrode electrolyte solution each comprising an active material are stored in, for example, positive electrode electrolyte solution tank 7 and negative electrode electrolyte solution tank 8 and supplied to the respective cell chambers through pumps or the like. Current generated by the redox flow battery may be exchanged from direct current to alternate current via AC-DC converter 9. The redox flow battery of the present embodiment is preferably a redox flow secondary battery.

The redox flow secondary battery comprising the membrane for a redox flow battery of the present embodiment has a structure where liquid-permeable porous current collector electrodes (for a negative electrode and for a positive electrode) are disposed on both sides, respectively, of the membrane and held by pressing; one of the chambers separated by the membrane serves as the positive electrode cell chamber, and the other serves as the negative electrode cell chamber; and the thicknesses of both the cell chambers are secured by a spacer.

In the case of a vanadium-type redox flow secondary battery, the charge and discharge of the battery are performed by circulating a positive electrode electrolyte solution consisting of a sulfuric acid electrolyte solution containing tetravalent vanadium ($V^{4+}$) and pentavalent vanadium ($V^{5+}$) in the positive electrode cell chamber and a negative electrode electrolyte solution containing trivalent vanadium ($V^{3+}$) and divalent vanadium ($V^{2+}$) in the negative electrode cell chamber. In this respect, at the time of charge, the vanadium ion $V^{4+}$ is oxidized into $V^{5+}$ for the emission of an electron in the positive electrode cell chamber, while $V^{3+}$ is reduced into $V^{2+}$ in the negative electrode cell chamber through an electron brought back through an external path. By this oxidation-reduction reaction, the proton ($H^+$) is an excess in the positive electrode cell chamber, whereas the proton ($H^+$) is insufficient in the negative electrode cell chamber. The membrane selectively moves an excess of protons in the positive electrode cell chamber to the negative electrode chamber so that electric neutrality is maintained. At the time of discharge, reaction opposite thereto proceeds. In this respect, energy efficiency (%) is indicated by a ratio (%) obtained by dividing a discharged energy by a charged energy. Both the energies depend on the internal resistance of a battery cell, the ion selectivity of the membrane and other current losses. Decrease in internal resistance improves voltage efficiency, and improvement in ion selectivity and reduction in other current losses improve energy efficiency. Therefore, these factors serve as important indexes for the redox flow battery.

<Carbon Electrode>

The carbon electrode for use in the redox flow battery is not particularly limited and preferably has a continuous void for the passage of the electrolyte solution therethrough. A porous material having a continuous void is more preferred. Examples of the carbon electrode having a continuous void include, but are not particularly limited to, carbon felt, carbon paper, and carbon foams. Among them, a carbon foam is more preferred from the viewpoint of high flexibility, a large surface area, and resistance that can be reduced. The carbon foam preferably has a structure having a three-dimensionally continuous carbon moiety. The carbon foam preferably has linear portions and node portions joining the linear portions. The electrode having this structure can have flexibility and a high surface area, and can yield a favorable battery without reducing energy efficiency even if a thinner membrane is used as the membrane in the redox flow battery.

The carbon foam may be compressed by a method known in the art, particularly, a method described in International Publication No. WO 2002/062879, to adjust a void ratio for use. The compression can adjust a void ratio and increase a carbon surface area per unit volume. Therefore, the resistance of the redox flow battery can be reduced.

[Membrane Electrode Assembly for Redox Flow Battery]

The membrane electrode assembly for a redox flow battery (hereinafter, also simply referred to as the "membrane electrode assembly") of the present embodiment comprises the membrane of the present embodiment, and a carbon electrode assembled with the membrane. The carbon electrode can be formed on at least one side of the membrane and may be formed on both sides thereof. In the case of forming a carbon electrode on one side of the membrane, the membrane electrode assembly is used as, for example, the positive electrode 1 and the membrane 5, or the negative electrode 3 and the membrane 5 in the redox flow battery 10 mentioned above. In the case of forming carbon electrodes on both sides of the membrane, the membrane electrode assembly is used as, for example, the positive electrode 1, the membrane 5, and the negative electrode 3 in the redox flow battery 10 mentioned above.

[Cell for Redox Flow Battery]

The cell for a redox flow battery (hereinafter, also simply referred to as the "cell") of the present embodiment comprises the membrane electrode assembly of the present embodiment. The cell of the present embodiment comprises, for example, the membrane electrode assembly of the present embodiment, and a non-impregnated current collecting plate contacted with the carbon electrode in the membrane electrode assembly. A current collecting plate known in the art for use in a redox flow battery can be used as the current collecting plate.

EXAMPLES

Hereinafter, the present embodiment will be described further specifically with reference to Examples. However, the present embodiment is not limited by Examples given below. Evaluation methods and measurement methods for use in the present embodiment are as follows.

<Film Thickness>

(Coated Film and Laminated Film)

The film thickness of an ion-exchange resin layer prepared by coating and the film thickness of a final membrane (laminated film) were evaluated using a film thickness meter "543-551-1/215-151" (manufactured by Mitutoyo Corp.).

(Anion-exchange resin layer) The thickness of an anion-exchange resin layer was evaluated by observing the cross section of a membrane under a scanning electron microscope (SEM). The SEM used was "SU8010" (manufactured by Hitachi High-Tech Corp.), and the film thickness was evaluated in a 20000× observation image. The cross section of the membrane was created using a microtome "EM UC7" (manufactured by Leica Camera AG).

<Curl Evaluation>

Curl was evaluated by dipping a cut membrane of 5 cm square in distilled water for 5 minutes, taking the membrane out thereof, and immediately thereafter measuring the degree of warpage using a ruler. FIG. 2 shows a schematic diagram of the method for evaluating curl. The degree of warpage refers to the distance (height) from a contact surface where the membrane was placed on a flat site to the end surface of the warped membrane (see portion a in FIG. 2). The warpage was evaluated from the largest value among four sides of the membrane.

A: 0 mm or more and less than 5 mm
B: 5 mm or more and less than 10 mm
C: 10 mm or more (including a curled up sample)

<Redox Flow Battery Evaluation>

In redox flow battery evaluation, a cell was used which was constituted by a Viton rubber gasket, a Teflon® flow channel frame, a graphite separator, and a stainless end plate. The membrane used was a 40×150 mm piece cut out from a membrane prepared in each of Examples and Comparative Examples. The film thickness of the gasket was adjusted such that the compression ratio (ratio in thickness between before and after compression) of an electrode was 62%. The electrode used was a 10×50 mm piece cut out from a carbon fiber nonwoven fabric "AAF304ZF" (product name, manufactured by Toyobo Co., Ltd.).

Tow electrodes, the membrane, and cell constituent members were combined according to a predetermined order and fastened using stainless bolts. The assembled cell was connected to an electrolyte solution circulation apparatus constituted by an electrolyte solution tank and a liquid feed pump. 30 mL of a vanadium sulfate solution having a vanadium ion concentration of 1.5 M, a vanadium ion valence of 3.5, a sulfate ion concentration of 4.5 M was added to the electrolyte solution tank and circulated at a flow rate of 7.5 mL/min. A charge and discharge test was conducted by the constant current method using a charge-discharge power source apparatus "PFX2011" (product name, manufactured by Kikusui Electronics Corp.) and a control unit "PFX2121" (product name, manufactured by Kikusui Electronics Corp.). The voltage range was 1.00 to 1.55 V, and the current density was 80 mA/cm$^2$.

(Power Efficiency)

Power efficiency was determined by dividing a discharged energy by a charged energy at the time of 2 cycles and 100 cycles of charge and discharge. Evaluation criteria are as follows.

Evaluation Criteria
A: Power efficiency of 88% or more
B: Power efficiency of 87% or more and less than 88%
C: Power efficiency of less than 87%

Synthesis Example 1: Synthesis of PBI-O

A separable flask was charged with 250 g of polyphosphoric acid (115% based on $H_3PO_4$, manufactured by Sigma-Aldrich Co., LLC) in a glove box, then hermetically sealed, and taken out of the glove box. The temperature was elevated to 90° C. in an oil bath, and the mixture was stirred at 100 rpm for 4 hours. Then, the flask was charged with 6.43 g of 3,3'-diaminobenzidine (manufactured by Sigma-Aldrich Co., LLC), and the internal temperature was elevated to 120° C. Then, the flask was charged with 7.75 g of 4,4'-dicarboxy ether (manufactured by Sigma-Aldrich Co., LLC), and the internal temperature was elevated to 200° C., followed by reaction for 24 hours after temperature elevation to 200° C. 24 hours later, the flask was charged with 192 g (100 mL) of polyphosphoric acid (105% based on $H_3PO_4$, manufactured by Nacalai Tesque Inc.), and the internal temperature was cooled to 100° C. to obtain a brown polymer solution. The reaction was carried out in an argon atmosphere.

The obtained polymer solution was reprecipitated in 4 L of ion-exchange water and filtered to obtain a solid in a threadlike form (threadlike solid 1). The obtained threadlike solid 1 was cut, and the cut pieces were stirred and washed in 4 L of ion-exchange water for 8 hours and in 3 L of methanol (manufactured by FUJIFILM Wao Pure Chemical Corp.) for 1 hour, then filtered, and dried under reduced pressure at 100° C. for 4 hours to obtain a black solid (dry solid 1).

The dry solid 1 was added into 1110 g (750 mL) of methanesulfonic acid (manufactured by FUJIFILM Wao Pure Chemical Corp.), dissolved by heating and stirring at 100° C., reprecipitated in 7.5 L of ion-exchange water, and filtered to obtain a threadlike solid again (threadlike solid 2). The obtained threadlike solid 2 was stirred and washed in 2 L of 0.1 M ammonia water (manufactured by Kanto Chemical Co., Inc.) for 8 hours, in 5 L of ion-exchange water for 8 hours, in 4 L of N,N-dimethylacetamide (manufactured by FUJIFILM Wao Pure Chemical Corp.) for 1 hour, and in 4 L of methanol for 1 hour. The solid thus washed was filtered and dried under reduced pressure at 100° C. for 24 hours to obtain 10.88 g of a brown solid (PBI—O).

Examples 1 to 17

An anion-exchange compound solution was prepared so as to contain 1% by mass of an anion-exchange compound shown in Table 1. A film is produced by casting from a dispersion containing 20% by mass of a cation-exchange resin shown in Table 1 on a polyimide (PI) film using a blade coater, and dried and annealed using temperatures and times shown in Table 1 to prepare a cation-exchange resin film (first ion-exchange resin layer) having a thickness after drying shown in Table 1.

The prepared cation-exchange resin film was affixed to a stage warmed to a temperature of 50° C. in a spray coating apparatus "PCS2020" (product name, manufactured by Asahi Sunac Corp.), and the anion-exchange compound solution was sprayed thereto under conditions involving a temperature of 50° C. in a vacuum chuck. Then, an anion-exchange resin layer was formed by drying under conditions shown in Table 1.

A second ion-exchange resin layer was formed on the formed anion-exchange resin layer under conditions of the following "press" or "coating" according to a formation method shown in Table 1 to obtain a membrane for a redox flow battery.

<Press>

A cation-exchange resin film (second ion-exchange resin layer) was prepared under the same conditions as in the first ion-exchange resin layer mentioned above. The prepared cation-exchange resin film was layered on the anion-exchange resin layer and subjected to heat press under conditions shown in Table 1.

<Coating>

A film was produced by casting on the anion-exchange resin layer using a blade coater, and dried and annealed using temperatures and times shown in Table 1 to form a cation-exchange resin film (second ion-exchange resin layer) having a thickness after drying shown in Table 1.

Comparative Example 1

A membrane for a redox flow battery was obtained in the same way as in Example 1 except that no anion-exchange resin layer was formed.

Comparative Example 2

A membrane for a redox flow battery was obtained in the same way as in Example 2 except that no second ion-exchange resin layer was formed.

Comparative Example 3

A membrane for a redox flow battery was obtained in the same way as in Example 2 except that the amount of spraying was adjusted such that the thickness of the anion-exchange resin layer was 5.0 μm.

Comparative Examples 4 and 5

Each membrane for a redox flow battery was obtained in the same way as in Example 2 except that the value obtained by dividing a thickness of the first ion-exchange resin layer by a thickness of the second ion-exchange resin layer was changed by adjusting the thicknesses of the cation-exchange resin films (first and second ion-exchange resin layers).

TABLE 1

| | | | Example 1 | Example 2 | Example 3 | Example 4 | Example 5 | Example 6 | Example 7 | Example 8 |
|---|---|---|---|---|---|---|---|---|---|---|
| First ion-exchange resin layer | Cation-exchange resin | | C-1 | C-1 | C-1 | C-1 | C-1 | C-1 | C-1 | C-1 |
| | Drying conditions | Temperature (° C.) | 80 | 80 | 80 | 80 | 80 | 80 | 80 | 80 |
| | | Time (min) | 20 | 20 | 20 | 20 | 20 | 20 | 20 | 20 |
| | Annealing conditions | Temperature (° C.) | 190 | 190 | 190 | 190 | 190 | 190 | 190 | 190 |
| | | Time (min) | 20 | 20 | 20 | 20 | 20 | 20 | 20 | 20 |
| | Cation-exchange resin layer thickness (μm) | | 12 | 12 | 12 | 12 | 12 | 12 | 12 | 12 |
| Anion-exchange resin layer | Anion-exchange compound | | VBTMA/DVB | P4VP | P4VP | P4VP | P4VP | P4VP | P4VP | P4VP |
| | Solvent | | EtOH | DMAc | DMAc | DMAc | DMAc | DMAc | DMAc | DMAc |
| | Spray coating temperature | | 50 | 80 | 80 | 80 | 80 | 80 | 80 | 80 |
| | Anion-exchange resin layer thickness (μm) | | 1.0 | 1.0 | 0.5 | 0.08 | 0.05 | 0.03 | 1.5 | 2.5 |
| | Drying conditions | Temperature (° C.) | 190 | 190 | 190 | 190 | 190 | 190 | 190 | 190 |
| | | Time (min) | 20 | 20 | 20 | 20 | 20 | 20 | 20 | 20 |
| Second ion-exchange resin layer | Cation-exchange resin | | C-1 | C-1 | C-1 | C-1 | C-1 | C-1 | C-1 | C-1 |
| | Press or coating | | Press | Press | Press | Press | Press | Press | Press | Press |
| | First press stage | Temperature (° C.) | 125 | 150 | 150 | 150 | 150 | 150 | 150 | 150 |
| | | Pressure (MPa) | 3 | 5 | 5 | 5 | 5 | 5 | 5 | 5 |
| | | Time (min) | 2 | 5 | 5 | 5 | 5 | 5 | 5 | 5 |
| | Second press stage | Temperature (° C.) | 150 | 180 | 180 | 180 | 180 | 180 | 180 | 180 |
| | | Pressure (MPa) | 3 | 3 | 3 | 3 | 3 | 3 | 3 | 3 |
| | | Time (min) | 3 | 3 | 3 | 3 | 3 | 3 | 3 | 3 |
| | Drying conditions | Temperature (° C.) | — | — | — | — | — | — | — | — |
| | | Time (min) | — | — | — | — | — | — | — | — |
| | Annealing conditions | Temperature (° C.) | — | — | — | — | — | — | — | — |
| | | Time (min) | — | — | — | — | — | — | — | — |
| | Cation-exchange resin layer thickness (μm) | | 12 | 12 | 12 | 12 | 12 | 12 | 12 | 12 |
| Total film thickness (μm) | | | 25 | 25 | 25 | 24 | 24 | 24 | 26 | 27 |
| First ion-exchange resin layer/Second ion-exchange resin layer | | | 1.0 | 1.0 | 1.0 | 1.0 | 1.0 | 1.0 | 1.0 | 1.0 |

| | | | Example 9 | Example 10 | Example 11 | Example 12 | Example 13 | Example 14 | Example 15 | Example 16 |
|---|---|---|---|---|---|---|---|---|---|---|
| First ion-exchange resin layer | Cation-exchange resin | | C-1 | C-1 | C-1 | C-1 | C-1 | C-3 | C-2 | C-2 |
| | Drying conditions | Temperature (° C.) | 80 | 80 | 80 | 80 | 80 | 80 | 80 | 80 |
| | | Time (min) | 20 | 20 | 20 | 20 | 20 | 20 | 20 | 20 |
| | Annealing conditions | Temperature (° C.) | 190 | 190 | 190 | 190 | 190 | 210 | 210 | 210 |
| | | Time (min) | 20 | 20 | 20 | 20 | 20 | 20 | 20 | 20 |

TABLE 1-continued

|  |  |  |  |  |  |  |  |  |  |  |
|---|---|---|---|---|---|---|---|---|---|---|
|  | Cation-exchange resin layer thickness (μm) |  | 13 | 15 | 12 | 11 | 12 | 12 | 12 | 20 |
| Anion-exchange resin layer | Anion-exchange compound |  | P4VP | P4VP | P4VP | P4VP | PBI | PBI | PBI | PBI |
|  | Solvent |  | DMAc | DMAc | DMAc | DMAc | DMAc | DMAc | DMAc | DMAc |
|  | Spray coating temperature |  | 80 | 80 | 80 | 80 | 80 | 80 | 80 | 80 |
|  | Anion-exchange resin layer thickness (μm) |  | 1.0 | 1.0 | 1.0 | 1.0 | 1.0 | 1.0 | 1.0 | 1.0 |
|  | Drying conditions | Temperature (° C.) | 190 | 190 | 190 | 190 | 230 | 230 | 230 | 230 |
|  |  | Time (min) | 20 | 20 | 20 | 20 | 20 | 20 | 20 | 20 |
| Second ion-exchange resin layer | Cation-exchange resin |  | C-1 | C-1 | C-1 | C-1 | C-1 | C-3 | C-2 | C-2 |
|  | Press or coating |  | Press | Press | Press | Press | Coating | Coating | Coating | Coating |
|  | First press stage | Temperature (° C.) | 150 | 150 | 150 | 150 | — | — | — | — |
|  |  | Pressure (MPa) | 5 | 5 | 5 | 5 | — | — | — | — |
|  |  | Time (min) | 5 | 5 | 5 | 5 | — | — | — | — |
|  | Second press stage | Temperature (° C.) | 180 | 180 | 180 | 180 | — | — | — | — |
|  |  | Pressure (MPa) | 3 | 3 | 3 | 3 | — | — | — | — |
|  |  | Time (min) | 3 | 3 | 3 | 3 | — | — | — | — |
|  | Drying conditions | Temperature (° C.) | — | — | — | — | 80 | 80 | 80 | 80 |
|  |  | Time (min) | — | — | — | — | 20 | 20 | 20 | 20 |
|  | Annealing conditions | Temperature (° C.) | — | — | — | — | 190 | 210 | 210 | 210 |
|  |  | Time (min) | — | — | — | — | 20 | 20 | 20 | 20 |
|  | Cation-exchange resin layer thickness (μm) |  | 12 | 12 | 14 | 15 | 12 | 12 | 12 | 20 |
| Total film thickness (μm) |  |  | 26 | 28 | 27 | 27 | 25 | 25 | 25 | 41 |
| First ion-exchange resin layer/ Second ion-exchange resin layer |  |  | 1.1 | 1.3 | 0.9 | 0.7 | 1.0 | 1.0 | 1.0 | 1.0 |

|  |  |  | Example 17 | Comparative Example 1 | Comparative Example 2 | Comparative Example 3 | Comparative Example 4 | Comparative Example 5 |
|---|---|---|---|---|---|---|---|---|
| First ion-exchange resin layer | Cation-exchange resin |  | C-2 | C-1 | C-1 | C-1 | C-1 | C-1 |
|  | Drying conditions | Temperature (° C.) | 80 | 80 | 80 | 80 | 80 | 80 |
|  |  | Time (min) | 20 | 20 | 20 | 20 | 20 | 20 |
|  | Annealing conditions | Temperature (° C.) | 210 | 190 | 190 | 190 | 190 | 190 |
|  |  | Time (min) | 20 | 20 | 20 | 20 | 20 | 20 |
|  | Cation-exchange resin layer thickness (μm) |  | 20 | 12 | 24 | 12 | 20 | 10 |
| Anion-exchange resin layer | Anion-exchange compound |  | PBI-O | — | P4VP | P4VP | P4VP | P4VP |
|  | Solvent |  | DMAc | — | DMAc | DMAc | DMAc | DMAc |
|  | Spray coating temperature |  | 80 | — | 80 | 80 | 80 | 80 |
|  | Anion-exchange resin layer thickness (μm) |  | 1.0 | 0 | 1.0 | 5.0 | 1.0 | 1.0 |
|  | Drying conditions | Temperature (° C.) | 230 | 190 | 190 | 190 | 190 | 190 |
|  |  | Time (min) | 20 | 20 | 20 | 20 | 20 | 20 |
| Second ion-exchange resin layer | Cation-exchange resin |  | C-2 | C-1 | — | C-1 | C-1 | C-1 |
|  | Press or coating |  | Coating | Press | — | Press | Press | Press |
|  | First press stage | Temperature (° C.) | — | 120 | — | 150 | 150 | 150 |
|  |  | Pressure (MPa) | — | 2 | — | 5 | 5 | 5 |
|  |  | Time (min) | — | 2 | — | 5 | 5 | 5 |
|  | Second press stage | Temperature (° C.) | — | 120 | — | 180 | 180 | 180 |
|  |  | Pressure (MPa) | — | 2 | — | 3 | 3 | 3 |
|  |  | Time (min) | — | 2 | — | 3 | 3 | 3 |
|  | Drying conditions | Temperature (° C.) | 80 | — | — | — | — | — |
|  |  | Time (min) | 20 | — | — | — | — | — |
|  | Annealing conditions | Temperature (° C.) | 210 | — | — | — | — | — |
|  |  | Time (min) | 20 | — | — | — | — | — |

TABLE 1-continued

| | | | | | | |
|---|---|---|---|---|---|---|
| Cation-exchange resin layer thickness (μm) | 20 | 13 | 0 | 12 | 3 | 20 |
| Total film thickness(μm) | 41 | 25 | 25 | 29 | 24 | 31 |
| First ion-exchange resin layer/ Second ion-exchange resin layer | 1.0 | 0.9 | — | 1.0 | 6.7 | 0.5 |

In Table 1, various abbreviations, etc. are as defined below.

C-1: Nafion dispersion (EW: 1100 g/mol, solid content: 20 wt %, manufactured by Sigma-Aldrich Co., LLC)

C-2: Aquivion dispersion D72-25BS (EW: 720 g/mol, solid content: 25 wt %, manufactured by Sigma-Aldrich Co., LLC)

C-3: Aquivion dispersion D98-25BS (EW: 980 g/mol, solid content: 25 wt %, manufactured by Sigma-Aldrich Co., LLC)

P4VP: polyvinylpyridine (weight-average molecular weight Mw: 60,000, manufactured by Sigma-Aldrich Co., LLC)

VBTMA/DVB: vinyl benzyl trimethylammonium chloride (VBDMA)/divinylbenzene (DVB) copolymer PBI: polybenzimidazole "MRS0810H" (weight-average molecular weight Mw: 55,000, manufactured by Sato Light Industrial Co., Ltd., polymer represented by the formula (A) given below)

PBI-O: polybenzimidazole produced in Synthesis Example 1 (weight-average molecular weight Mw: 60,000, polymer represented by the formula (A) given below)

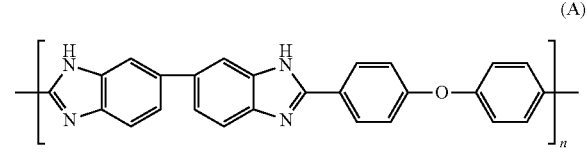

(A)

EtOH: ethanol

DMAc: dimethylacetamide

The evaluation mentioned above was conducted using the membranes obtained by Examples and Comparative Examples mentioned above, and the results are shown in Table 2.

TABLE 2

| | | | Example 1 | Example 2 | Example 3 | Example 4 | Example 5 | Example 6 | Example 7 | Example 8 |
|---|---|---|---|---|---|---|---|---|---|---|
| Membrane | First ion-exchange resin layer | Cation-exchange resin | C-1 | C-1 | C-1 | C-1 | C-1 | C-1 | C-1 | C-1 |
| | | Thickness (μm) | 12 | 12 | 12 | 12 | 12 | 12 | 12 | 12 |
| | Anion-exchange resin layer | Anionic compound | VBTMA/DVB | P4VP | P4VP | P4VP | P4VP | P4VP | P4VP | P4VP |
| | | Thickness (μm) | 1.0 | 1.0 | 0.5 | 0.08 | 0.05 | 0.03 | 1.5 | 2.5 |
| | Second ion-exchange resin layer | Cation-exchange resin | C-1 | C-1 | C-1 | C-1 | C-1 | C-1 | C-1 | C-1 |
| | | Thickness (μm) | 12 | 12 | 12 | 12 | 12 | 12 | 12 | 12 |
| | | Formation method | Press | Press | Press | Press | Press | Press | Press | Press |
| | Total film thickness of laminated film | | 25.0 | 25.0 | 24.5 | 24.1 | 24.1 | 24.0 | 25.5 | 26.5 |
| | First functional layer/second functional layer | | 1.0 | 1.0 | 1.0 | 1.0 | 1.0 | 1.0 | 1.0 | 1.0 |
| | The number of layers laminated | | 3 | 3 | 3 | 3 | 3 | 3 | 3 | 3 |
| Evaluation | Curl | | A | A | A | A | A | A | A | A |
| | 2 cycles | Power efficiency | A | A | A | A | B | B | B | B |
| | 100 cycles | Power efficiency | A | A | A | B | B | B | A | B |

| | | | Example 9 | Example 10 | Example 11 | Example 12 | Example 13 | Example 14 | Example 15 | Example 16 |
|---|---|---|---|---|---|---|---|---|---|---|
| Membrane | First ion-exchange resin layer | Cation-exchange resin | C-1 | C-1 | C-1 | C-1 | C-1 | C-3 | C-2 | C-2 |
| | | Thickness (μm) | 13 | 15 | 12 | 11 | 12 | 12 | 12 | 20 |

TABLE 2-continued

|  |  |  |  |  |  |  |  |  |  |
|---|---|---|---|---|---|---|---|---|---|
| Anion-exchange resin layer | Anionic compound | P4VP | P4VP | P4VP | P4VP | PBI | PBI | PBI | PBI |
|  | Thickness (μm) | 1.0 | 1.0 | 1.0 | 1.0 | 1.0 | 1.0 | 1.0 | 1.0 |
| Second ion-exchange resin layer | Cation-exchange resin | C-1 | C-1 | C-1 | C-1 | C-1 | C-3 | C-2 | C-2 |
|  | Thickness (μm) | 12 | 12 | 14 | 15 | 12 | 12 | 12 | 20 |
|  | Formation method | Press | Press | Press | Press | Coating | Coating | Coating | Coating |
|  | Total film thickness of laminated film | 26.0 | 28.0 | 27.0 | 27.0 | 25.0 | 25.0 | 25.0 | 41.0 |
|  | First functional layer/second functional layer | 1.1 | 1.3 | 0.9 | 0.7 | 1.0 | 1.0 | 1.0 | 1.0 |
|  | The number of layers laminated | 3 | 3 | 3 | 3 | 3 | 3 | 3 | 3 |
| Evaluation | Curl | A | B | A | B | A | A | A | A |
|  | 2 cycles Power efficiency | A | A | A | A | A | A | A | A |
|  | 100 cycles Power efficiency | A | A | A | A | A | A | A | A |

|  |  |  | Example 17 | Comparative Example 1 | Comparative Example 2 | Comparative Example 3 | Comparative Example 4 | Comparative Example 5 |
|---|---|---|---|---|---|---|---|---|
| Membrane | First ion-exchange resin layer | Cation-exchange resin | C-2 | C-1 | C-1 | C-1 | C-1 | C-1 |
|  |  | Thickness (μm) | 20 | 12 | 24 | 12 | 20 | 10 |
|  | Anion-exchange resin layer | Anionic compound | PBI-O | — | P4VP | P4VP | P4VP | P4VP |
|  |  | Thickness (μm) | 1.0 | 0.0 | 1.0 | 5.0 | 1.0 | 1.0 |
|  | Second ion-exchange resin layer | Cation-exchange resin | C-2 | C-1 | — | C-1 | C-1 | C-1 |
|  |  | Thickness (μm) | 20 | 13 | 0 | 12 | 3 | 20 |
|  |  | Formation method | Coating | Press | — | Press | Press | Press |
|  | Total film thickness of laminated film |  | 41.0 | 25.0 | 25.0 | 29.0 | 24.0 | 31.0 |
|  | First functional layer/second functional layer |  | 1.0 | 0.9 | — | 1.0 | 6.7 | 0.5 |
|  | The number of layers laminated |  | 3 | 2 | 2 | 3 | 3 | 3 |
| Evaluation | Curl |  | A | A | C | A | C | C |
|  | 2 cycles Power efficiency |  | A | C | A | C | B | B |
|  | 100 cycles Power efficiency |  | A | C | C | C | C | C |

The invention claimed is:

1. A membrane for a redox flow battery, comprising
a first ion-exchange resin layer,
an anion-exchange resin layer containing an anion-exchange compound, and
a second ion-exchange resin layer
in the presented order, wherein
a value obtained by dividing a thickness of the first ion-exchange resin layer by a thickness of the second ion-exchange resin layer is 0.7 or more and 1.3 or less, and
a thickness of the anion-exchange resin layer is 0.02 μm or larger and 3 μm or smaller.

2. The membrane for a redox flow battery according to claim 1, wherein
each of the thicknesses of the first ion-exchange resin layer and the second ion-exchange resin layer is 5 μm or larger and 50 μm or smaller.

3. The membrane for a redox flow battery according to claim 1 or 2, wherein
at least one of the first ion-exchange resin layer and the second ion-exchange resin layer contains a cation-exchange resin.

4. The membrane for a redox flow battery according to claim 1 or 2, wherein
both of the first ion-exchange resin layer and the second ion-exchange resin layer contain a cation-exchange resin.

5. The membrane for a redox flow battery according to claim 4, wherein the cation-exchange resin comprises a fluorine-type high-molecular electrolyte polymer.

6. The membrane for a redox flow battery according to claim 1 or 2, wherein
the anion-exchange compound has a tertiary amino group or a quaternary ammonium group.

7. The membrane for a redox flow battery according to claim 4, wherein
the anion-exchange compound has a tertiary amino group or a quaternary ammonium group.

8. The membrane for a redox flow battery according to claim 5, wherein
the anion-exchange compound has a tertiary amino group or a quaternary ammonium group.

9. A membrane electrode assembly for a redox flow battery, comprising
the membrane for a redox flow battery according to claim 1 or 2, and
a carbon electrode assembled with the membrane for a redox flow battery.

10. A cell for a redox flow battery, comprising the membrane electrode assembly according to claim 9.

11. A redox flow battery comprising an electrolyzer, the electrolyzer comprising: a positive electrode cell chamber comprising a positive electrode consisting of a carbon electrode; a negative electrode cell chamber comprising a negative electrode consisting of a carbon electrode; and a membrane that separates the positive electrode cell chamber and the negative electrode cell chamber, wherein
the positive electrode cell chamber comprises a positive electrode electrolyte solution comprising an active material,
the negative electrode cell chamber comprises a negative electrode electrolyte solution comprising an active material, and
the membrane is the membrane for a redox flow battery according to claim 1 or 2.

12. A membrane electrode assembly for a redox flow battery, comprising
the membrane for a redox flow battery according to claim 5, and
a carbon electrode assembled with the membrane for a redox flow battery.

13. A membrane electrode assembly for a redox flow battery, comprising
the membrane for a redox flow battery according to claim 6, and
a carbon electrode assembled with the membrane for a redox flow battery.

14. A redox flow battery comprising an electrolyzer, the electrolyzer comprising: a positive electrode cell chamber comprising a positive electrode consisting of a carbon electrode; a negative electrode cell chamber comprising a negative electrode consisting of a carbon electrode; and a membrane that separates the positive electrode cell chamber and the negative electrode cell chamber, wherein
the positive electrode cell chamber comprises a positive electrode electrolyte solution comprising an active material,
the negative electrode cell chamber comprises a negative electrode electrolyte solution comprising an active material, and
the membrane is the membrane for a redox flow battery according to claim 5.

15. A redox flow battery comprising an electrolyzer, the electrolyzer comprising: a positive electrode cell chamber comprising a positive electrode consisting of a carbon electrode; a negative electrode cell chamber comprising a negative electrode consisting of a carbon electrode; and a membrane that separates the positive electrode cell chamber and the negative electrode cell chamber, wherein
the positive electrode cell chamber comprises a positive electrode electrolyte solution comprising an active material,
the negative electrode cell chamber comprises a negative electrode electrolyte solution comprising an active material, and
the membrane is the membrane for a redox flow battery according to claim 6.

16. A method for producing a membrane for a redox flow battery, wherein
the membrane for a redox flow battery according to claim 1 is produced by the method, and
the method comprises:
forming the anion-exchange resin layer on the first ion-exchange resin layer to obtain a first ion-exchange resin layer/anion-exchange resin layer construct; and
forming the second ion-exchange resin layer on the anion-exchange resin layer of the construct.

17. A method for producing a membrane for a redox flow battery, wherein
the membrane for a redox flow battery according to claim 1 is produced by the method, and
the method comprises:
forming the anion-exchange resin layer on the first ion-exchange resin layer to obtain a first ion-exchange resin layer/anion-exchange resin layer construct;
forming the anion-exchange resin layer on the second ion-exchange resin layer to obtain a second ion-exchange resin layer/anion-exchange resin layer construct; and
laminating the first ion-exchange resin layer/anion-exchange resin layer construct and the second ion-exchange resin layer/anion-exchange resin layer construct at surfaces of their respective anion-exchange resin layers, followed by adhesion by heat press.

* * * * *